(12) United States Patent
Reed

(10) Patent No.: US 9,097,031 B2
(45) Date of Patent: Aug. 4, 2015

(54) MOLDED HUNTING BLIND

(71) Applicant: Ricky C. Reed, Watertown, NY (US)

(72) Inventor: Ricky C. Reed, Watertown, NY (US)

(*) Notice: Subject to any disclaimer, the term of this patent is extended or adjusted under 35 U.S.C. 154(b) by 0 days.

(21) Appl. No.: 14/071,043

(22) Filed: Nov. 4, 2013

(65) Prior Publication Data

US 2015/0122300 A1     May 7, 2015

(51) Int. Cl.
*E04H 15/00* (2006.01)
*B29C 67/00* (2006.01)
*A01M 31/02* (2006.01)
*G21F 7/03* (2006.01)

(52) U.S. Cl.
CPC ........... *E04H 15/001* (2013.01); *A01M 31/025* (2013.01); *B29C 67/0007* (2013.01); *G21F 7/03* (2013.01)

(58) Field of Classification Search
CPC . A01M 31/025; E04H 1/1205; E04H 15/001; Y10S 135/901; G21F 7/02; G21F 7/03
USPC ................... 52/79.1, 79.4, 79.9, 171.1; 43/1; 135/901; D30/108
See application file for complete search history.

(56) References Cited

U.S. PATENT DOCUMENTS

| | | | | |
|---|---|---|---|---|
| 3,953,949 A * | 5/1976 | O'Sheeran | ...................... | 52/82 |
| 4,372,251 A * | 2/1983 | Keith | ........................... | 119/482 |
| 4,672,779 A * | 6/1987 | Boyd | .............................. | 52/79.4 |
| 4,974,265 A * | 12/1990 | Maggio | ........................... | 4/449 |
| 5,093,941 A * | 3/1992 | Muller | ............................ | 4/479 |
| D334,627 S * | 4/1993 | Morris | ........................ | D25/16 |
| 5,479,738 A * | 1/1996 | Danna | ................................ | 43/1 |
| 5,524,381 A * | 6/1996 | Chahroudi | ....................... | 47/17 |
| 6,129,252 A * | 10/2000 | Jackson et al. | ................ | 224/406 |
| 6,302,052 B1 * | 10/2001 | Sauerwein | .................... | 114/351 |
| D450,890 S * | 11/2001 | Van Buuren | ................. | D30/108 |
| 7,325,364 B2 * | 2/2008 | Leininger et al. | ............ | 52/169.6 |
| D652,995 S * | 1/2012 | VanBuuren et al. | ......... | D30/108 |
| 8,756,872 B2 * | 6/2014 | Preg | ................................. | 52/65 |
| 8,966,831 B1 * | 3/2015 | Stoll | .............................. | 52/79.4 |
| 2007/0033853 A1 * | 2/2007 | Ridge | ................................ | 43/1 |
| 2009/0277094 A1 * | 11/2009 | Ward | .............................. | 49/413 |
| 2014/0047781 A1 * | 2/2014 | Miller | ........................... | 52/79.5 |
| 2014/0083023 A1 * | 3/2014 | King et al. | ..................... | 52/79.1 |

* cited by examiner

*Primary Examiner* — Brent W Herring
(74) *Attorney, Agent, or Firm* — Harris Beach PLLC

(57) ABSTRACT

A molded hunting blind includes a one piece molded body. The molded hunting blind also includes a molded door and a plurality of windows at least one archery door with a taper configured to limit movement or at least one gun door with a gun rest and an arm rest. A method to mold a one piece hunting blind body is also described.

19 Claims, 23 Drawing Sheets

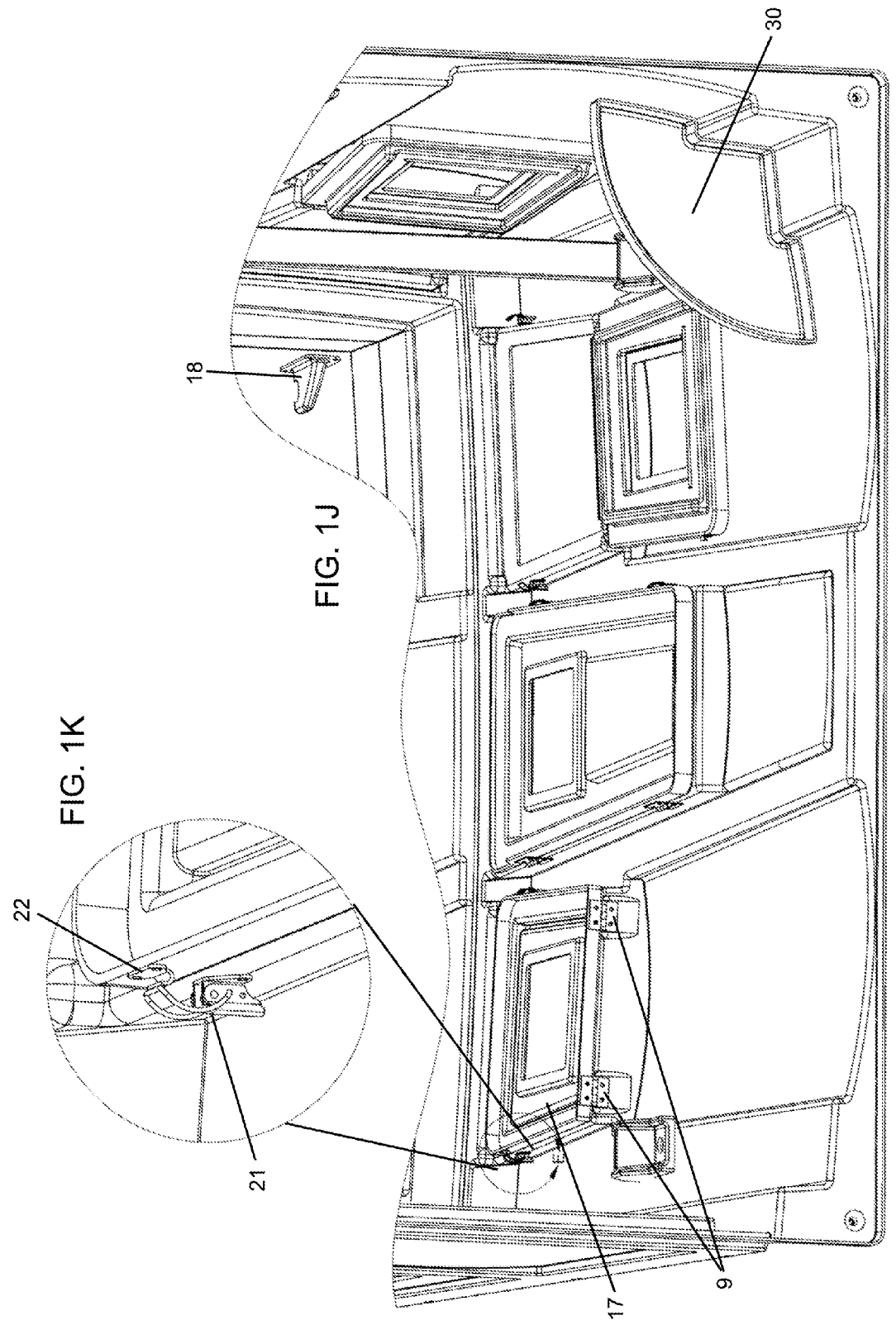

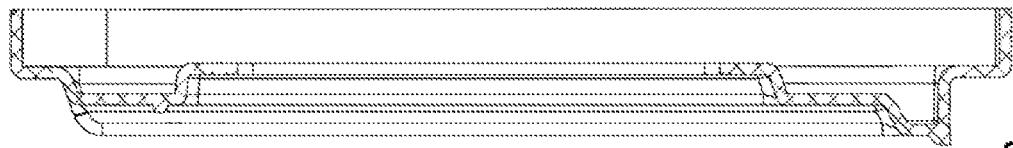
FIG. 3G
FIG. 3B
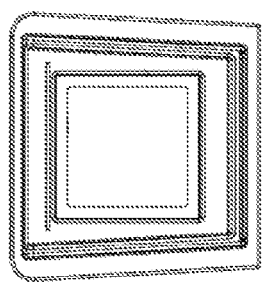
FIG. 3C
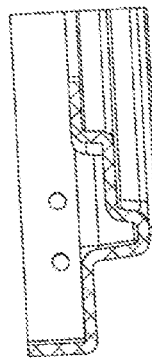
FIG. 3F
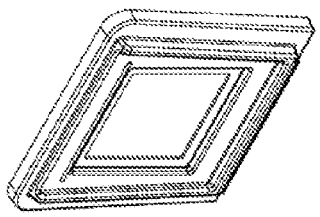
FIG. 3A
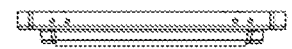
FIG. 3D
FIG. 3E

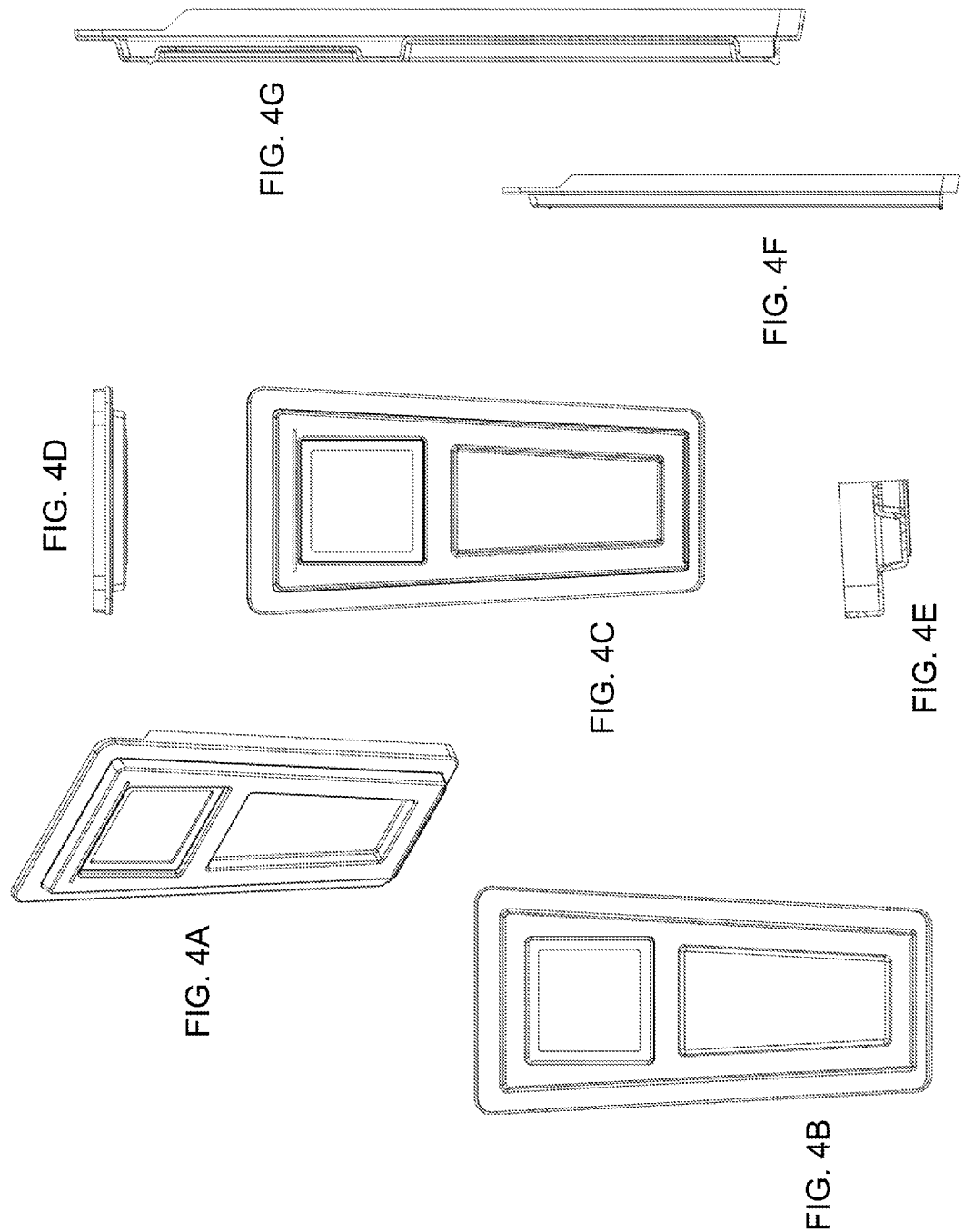

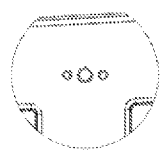
FIG. 5I
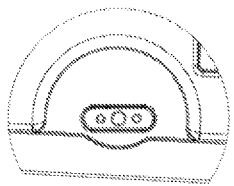
FIG. 5J
FIG. 5H
FIG. 5G
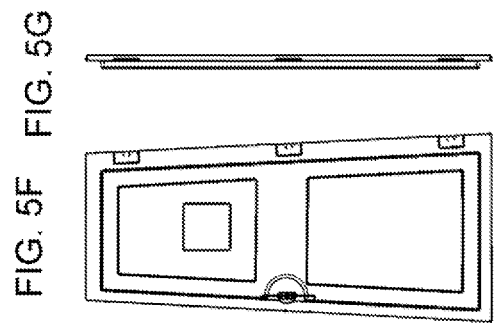
FIG. 5F
FIG. 5K
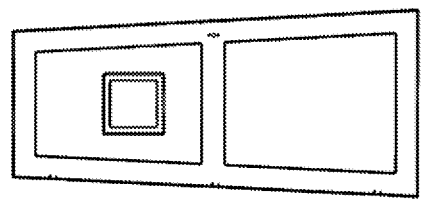
FIG. 5E
FIG. 5C
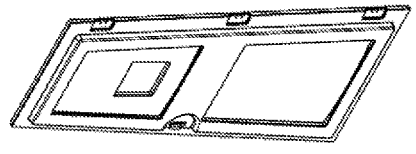
FIG. 5D
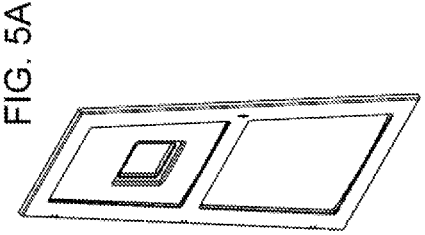
FIG. 5A
FIG. 5B

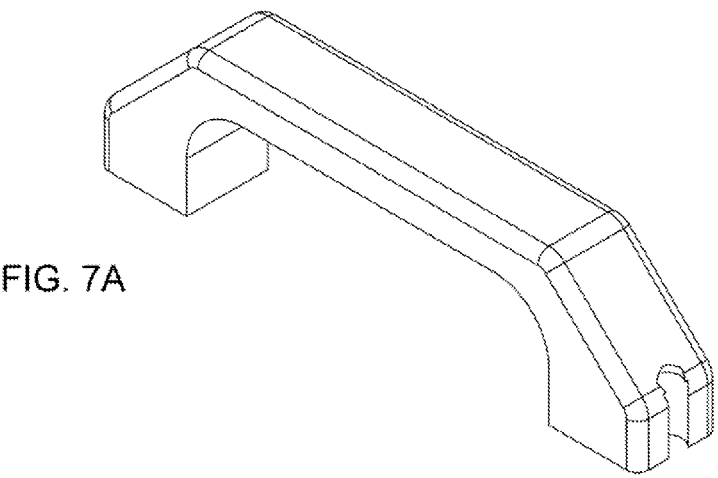
FIG. 7A
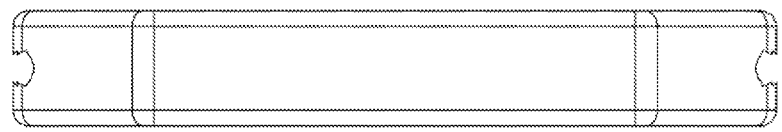
FIG. 7B
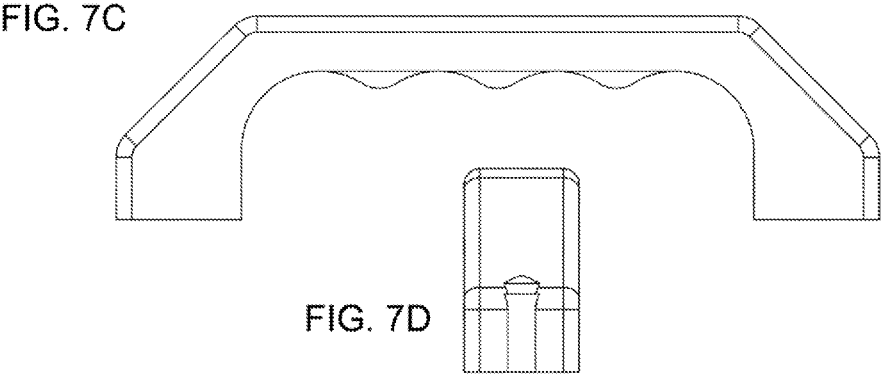
FIG. 7C
FIG. 7D
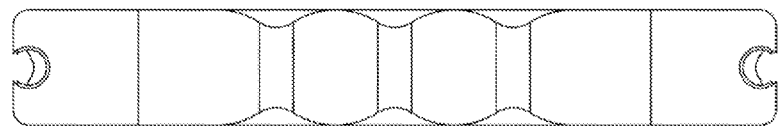
FIG. 7E

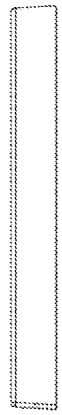
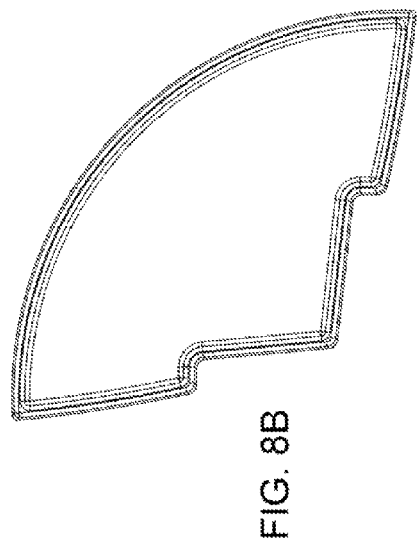
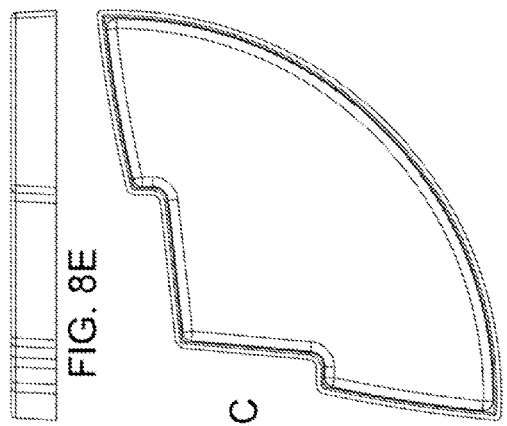
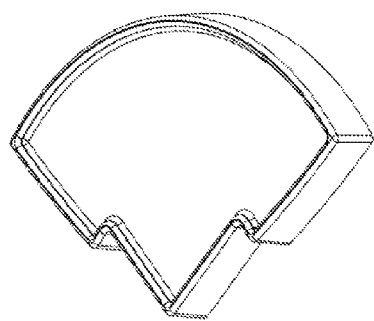
FIG. 8A  FIG. 8B  FIG. 8C  FIG. 8D  FIG. 8E  FIG. 8F  FIG. 8G

MOLDED HUNTING BLIND

FIELD OF THE INVENTION

The invention relates to hunting blind, more particularly to a molded hunting blind.

BACKGROUND OF THE INVENTION

Hunting blinds are important for hunting and nature photography. Hunting blinds hide occupants from view so that wild animals can be viewed in a relatively undisturbed condition.

SUMMARY OF THE INVENTION

According to one aspect, a molded hunting blind includes a one piece molded body. The molded hunting blind also includes a molded door and a plurality of windows; and at least one of: an archery door with a taper configured to limit movement; and a gun door with a gun rest and an arm rest.

In one embodiment, the one piece molded body includes walls which slant inward towards a roof.

In another embodiment, the walls slant inward towards the roof at an angle of between about 1 degree and about 18 degrees.

In yet another embodiment, two or more of the one piece molded bodies are configured to be nestably stackable.

In yet another embodiment, the archery window and the gun window are configured to open inwardly to minimize detection by wildlife.

In yet another embodiment, the archery door and the gun door are recessed in a wall of the molded hunting blind.

In yet another embodiment, the one piece body further includes a plurality of outwardly protruding molded sections configured to house an inwardly open window or door.

In yet another embodiment, the archery door includes a vertical taper of between about 1 degree and 8 degrees off vertical.

In yet another embodiment, the one piece body further includes a plurality of outwardly protruding molded sections configured to mechanically strengthen the molded hunting blind.

In yet another embodiment, the one piece molded body includes molded brackets configured to accept the arm rest.

In yet another embodiment, the arm rest is configurable to a right hand or left hand shooter.

In yet another embodiment, the molded hunting blind further includes a molded gun rack.

In yet another embodiment, the molded hunting blind further includes a molded shelf.

In yet another embodiment, a color is died into a plastic of the one piece molded body.

In yet another embodiment, an outside surface of the one piece molded body includes a light color and inside surface of the one piece molded body includes a dark color for use in warm or hot temperature applications.

In yet another embodiment, an outside surface of the one piece molded body includes a dark color and inside surface of the one piece molded body includes a dark color for use in cool or cold temperature applications.

In yet another embodiment, the molded hunting blind further includes handles configured for carrying and positioning the hunting blind.

In yet another embodiment, the molded hunting blind further includes holes in a base flange configured for anchoring the hunting blind.

In yet another embodiment, the one piece molded body is seamless.

According to another aspect, a process for molding a one piece molded hunting blind including the steps of: providing a mold of the one piece molded hunting blind; providing a molding material; and molding the one piece molded body.

In one embodiment, the step of molding includes molding simultaneously a plurality of hunting blind components using a common mold.

In another embodiment, the step of providing a molding material includes providing a molding material including a first molding material having a first color for forming an outer surface of the molded hunting blind and a second molding material having a second color for forming an inner surface of the molded hunting blind.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 1J shows a detailed underside isometric cut away view of molded hunting blind of FIG. 1A;

FIG. 1K shows a more detailed cut away view latch mechanism and hook;

FIG. 3A shows an isometric view of an exemplary gun door;

FIG. 3B shows a top view of the gun door of FIG. 3A;

FIG. 3C shows a front view of the gun door of FIG. 3A;

FIG. 3D shows a side view of the gun door of FIG. 3A;

FIG. 3E shows a top view of the gun door of FIG. 3A showing mounting holes for the door hinges;

FIG. 3F shows a section view of the gun door of FIG. 3E in a horizontal plane;

FIG. 3G shows a section view of the gun door which is cut vertically in the center of the part of the gun door of FIG. 3A;

FIG. 4A shows an isometric view of an exemplary archery door;

FIG. 4B shows an exterior front view of the archery door of FIG. 4A;

FIG. 4C shows an interior view of the archery door of FIG. 4A;

FIG. 4D shows a top view of the archery door of FIG. 4A;

FIG. 4E shows a section view with more detail of the archery door of FIG. 4A;

FIG. 4F shows a side view of the archery door of FIG. 4A;

FIG. 4G shows more detail in a side view of the archery door of FIG. 4A;

FIG. 5A shows an isometric view of the exterior of an exemplary main door;

FIG. 5B shows an isometric view of the interior of the main door of FIG. 5A;

FIG. 5C shows a top view of the main door of FIG. 5A;

FIG. 5D shows a front view of the main door of FIG. 5A;

FIG. 5E shows a side view of the main door of FIG. 5A;

FIG. 5F shows an interior view of the main door of FIG. 5A;

FIG. 5G shows another side view of the main door of FIG. 5A;

FIG. 5H shows a detailed section view of the main door of FIG. 5A;

FIG. 5I shows a detailed front cut away view of holes for the door handle of the main door of FIG. 5A;

FIG. 5J shows a detailed interior cut away view of the interior section of FIG. 5I;

FIG. 5K shows another more detailed section view of the main door of FIG. 5A;

FIG. 7A shows an isometric view of an exemplary carrying handle;

FIG. 7B shows a top view of the carrying handle of FIG. 7A;

FIG. 7C shows a side view of the carrying handle of FIG. 7A;

FIG. 7D shows an end view of the carrying handle of FIG. 7A;

FIG. 7E shows a bottom view of the carrying handle of FIG. 7A;

FIG. 8A shows an isometric view of an exemplary seat;
FIG. 8B shows a top view of the seat of FIG. 8A;
FIG. 8C shows a bottom view of the seat of FIG. 8A;
FIG. 8D shows a side view of the seat of FIG. 8A;
FIG. 8E shows another side view of the seat of FIG. 8A;
FIG. 8F shows yet another side view of the seat of FIG. 8A;

FIG. 8G shows a detailed section view of the seat of FIG. 8A;

DETAILED DESCRIPTION

Figure 1A:
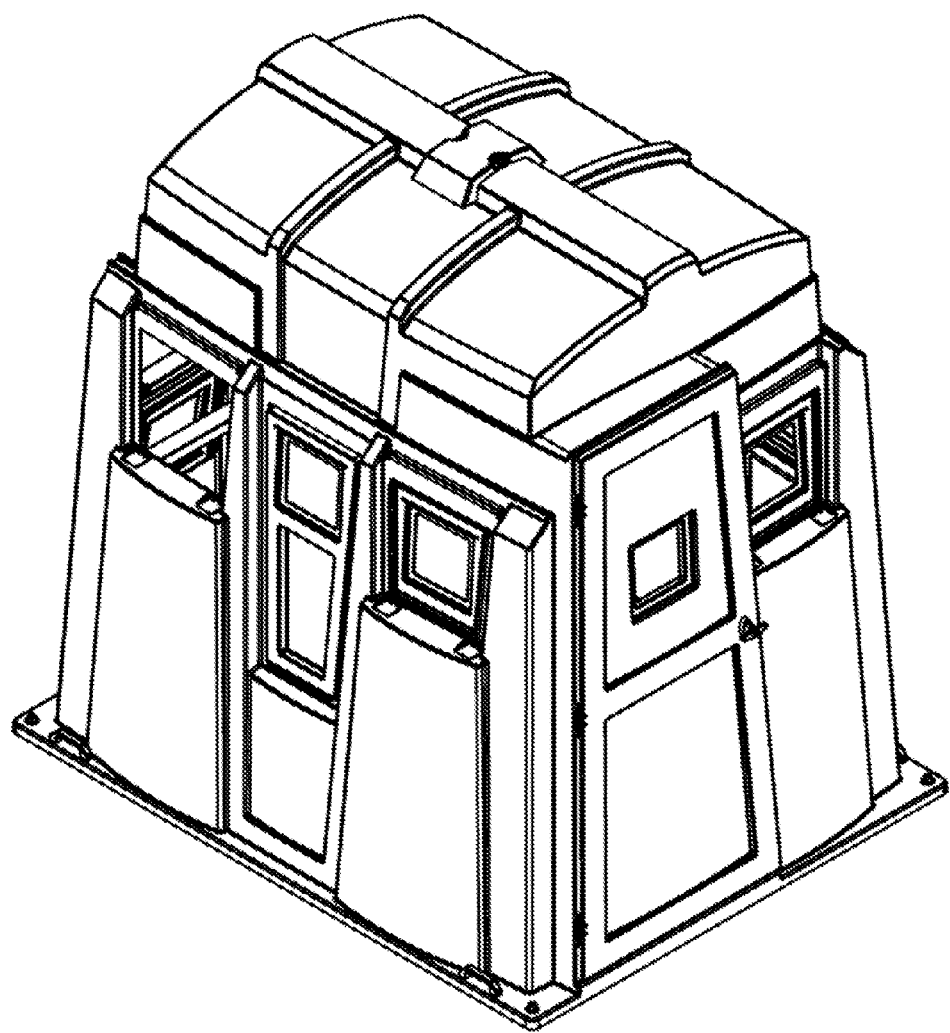
FIG. 1A shows an isometric view of one embodiment of an exemplary molded hunting blind.

FIG. 1A shows a drawing of one embodiment of a molded hunting blind. The molded body can be provided as a one piece main body unit with no assembly of the main body or seams to the (seamless) main body. Molded hunting blinds as described herein can be conveniently stacked one within the other for shipping, storage, and transport in numbers to one or more hunting sites. The structure design allows such molded hunting blinds to be built for durability, such as with a relatively heavy gauge one piece molded plastic for strength, while remaining light enough in weight to move into position using handles. Multi-purpose molded hunting blind can be used for, for example, archery hunting, gun hunting, ice fishing, and filming. There can also be molded rain gutters over the windows and doors. The rain gutters are important for extended occupancy over hours to days during rain or snow. Keeping rain or melting snow water out of the hunting blind is important both for a general state of well-being of the hunter and/or photographer as well as to minimize damage to expensive hunting gear including hunting rifles and/or still or video cameras and other electronic equipment. Holes or other suitable openings in a lower flange can be used to secure the hunting blind against undesired movement.

Figure 1B:
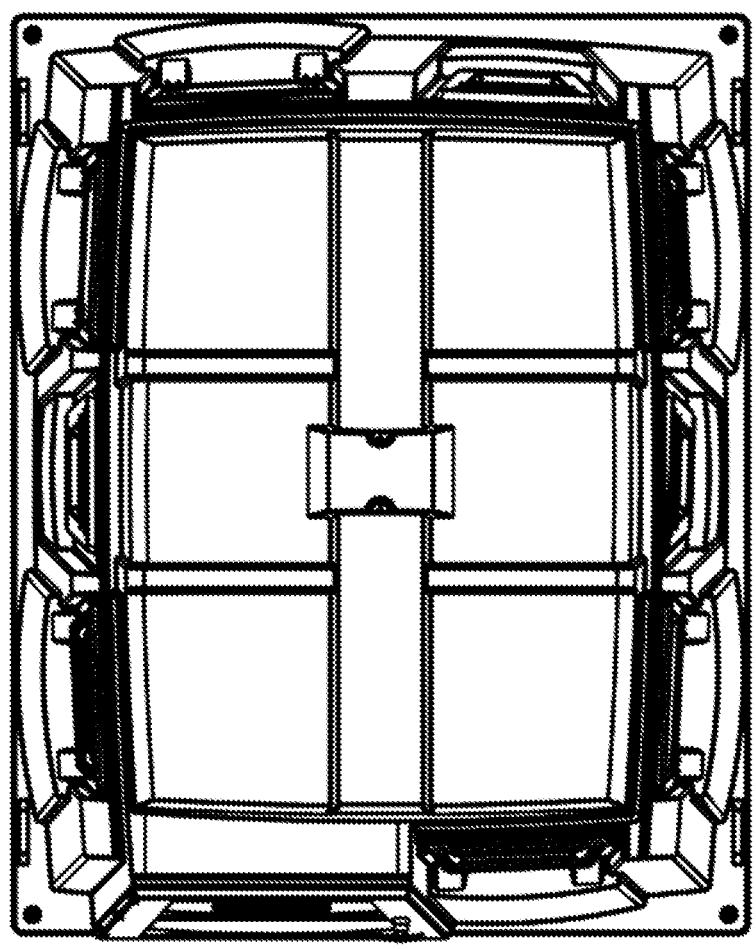
FIG. 1B shows the roof of the hunting blind of FIG. 1A.

FIG. 1B shows the roof of the exemplary hunting blind of FIG. 1A. The molded hunting blind can be vented for better air circulation.

Doors and windows can be provided as molded parts that can be assembled onto the main body. The exemplary embodiment includes an archery window with a taper to limit movement and a gun window with a gun rest, and an elbow/arm rest for shooting. A low profile Archery window is shaped specifically for archery hunters. The archery window can be tapered to limit movement and made elongated for more room to draw the bow without being spotted. The archery window can also be tapered wider at the top for adequate shooting room and narrow at the bottom to limit visibility from being spotted. The archery door vertical taper typically ranges from about 1 degree to about 8 degrees off vertical, preferably less than about 5 degrees. The exemplary embodiment also includes filming windows for still and/or video photography use. One exemplary embodiment includes gun windows with a gun rest lip. Windows can be made to open inward and down allowing more room when open and less chance of being spotted when opening.

Prior art hunting shelters or hunting blinds typically do not have an arm rest. One exemplary embodiment also includes an elbow/arm shooting rest. In most embodiments, the arm rest is slid into brackets in the one piece molded body. By installing the arm rest in one end or side or the other end or side of the hunting blind, the arm rest can accommodate left hand and right hand shooters. As compared with fixed non-movable arm rests, there is more room in the hunting blind, because only arm rests in actual use (right or left handed as desired) are typically installed near a gun door in active use.

The interior can include molded attachable shelves. The interior can also include one or more molded attachable gun racks.

The molded hunting blind can be made to reduce heat for hunting in warmer climates. For example, a lighter color can be used on the outside and a darker color on the inside for use in summer and/or warm or hot temperature applications. Similarly, the outside can be made darker for better solar heating in winter and/or cold weather applications. The colors can be died into the surfaces of the plastic. Also, a darker inside color helps the hunter or photographer from being spotted. For example, by making the shelter darker to blend in with camouflage that the hunter will be wearing making movement by the hunter harder to detect. In the southern United States, for example, the shelter can be a lighter color on the outside to blend in with the terrain. If colored on the inside with the same lighter color, movement inside the shelter would likely be quickly spotted.

Figure 1C:
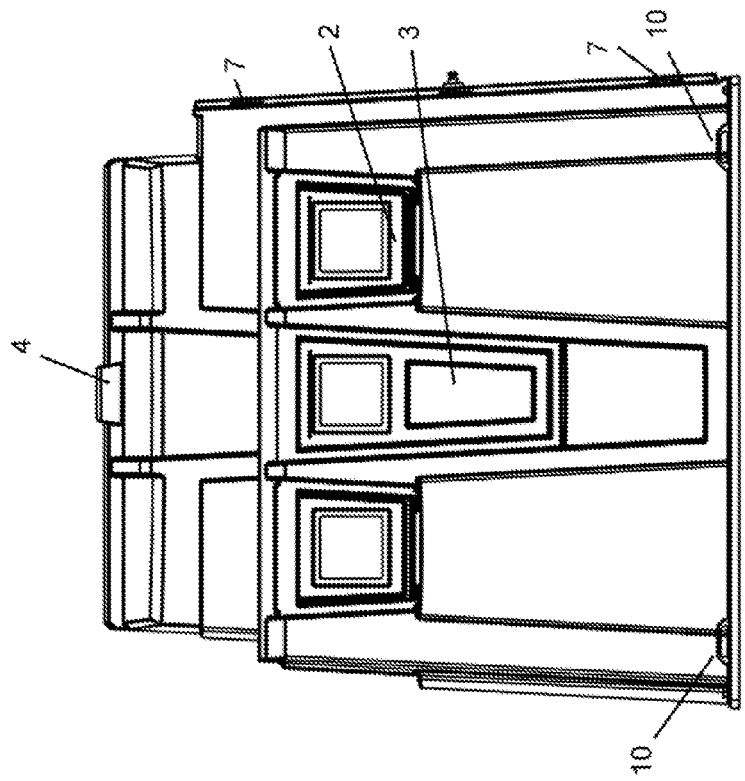
FIG. 1C shows an end view of the molded hunting blind of FIG. 1A.

FIG. 1C shows an end view of the molded hunting blind of FIG. 1A having a one piece molded body 1.

Figure 1D:
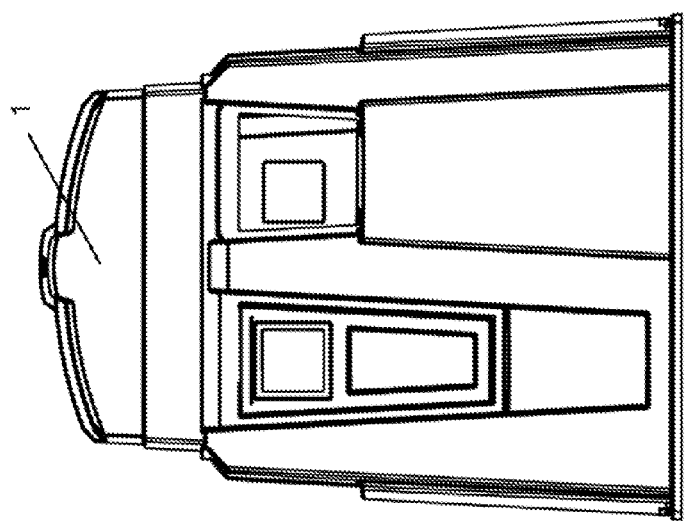
FIG. 1D shows a side view of the molded hunting blind of FIG. 1A.
Figure 1F:
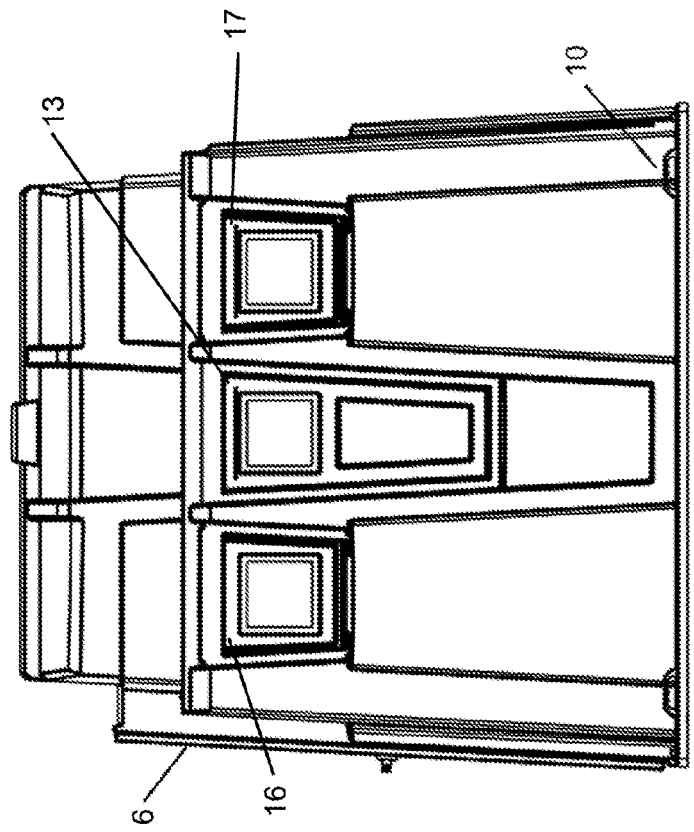
FIG. 1F shows another side view of the molded hunting blind of FIG. 1A.

FIG. 1D shows a side view of the molded hunting blind of FIG. 1A. Archery door 3 having an archery window is shown on a side wall. The molded hunting blind can be vented by roof vent 4 for better air circulation. The gun door and archery door can be hinged by a hinge 7. Handles 10 allow for convenient loading and unloading for transport as well as for placing the molded hunting blind in a use location, typically outdoors on any suitable ground surface.

Figure 1E:
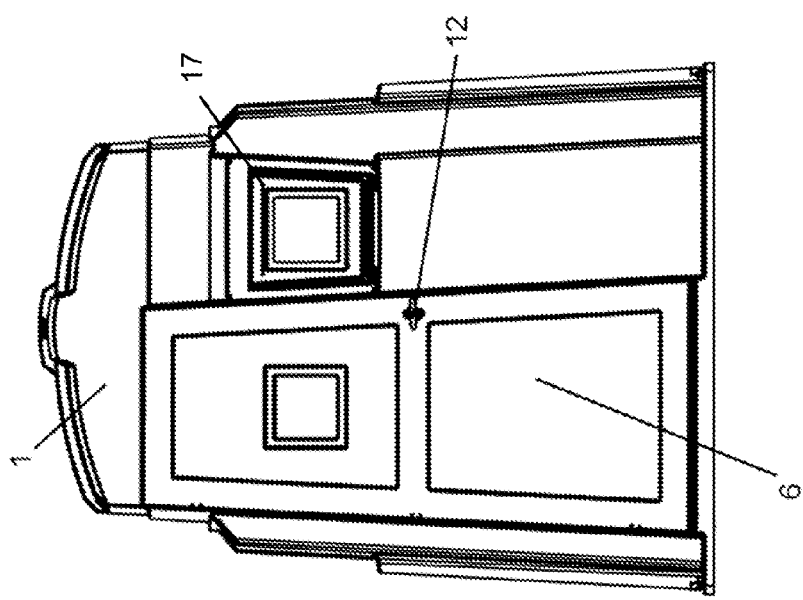
FIG. 1E shows another end view of the molded hunting blind of FIG. 1A.

FIG. 1E shows another end view of the molded hunting blind of FIG. 1A. A main door 6 is shown having a gun door handle 12. Filming window 17 can be seen next to the main door 6.

FIG. 1D shows another side view of the molded hunting blind of FIG. 1A having an archery window 13, a gun door 16, and a filming window 17.

Figure 1H:
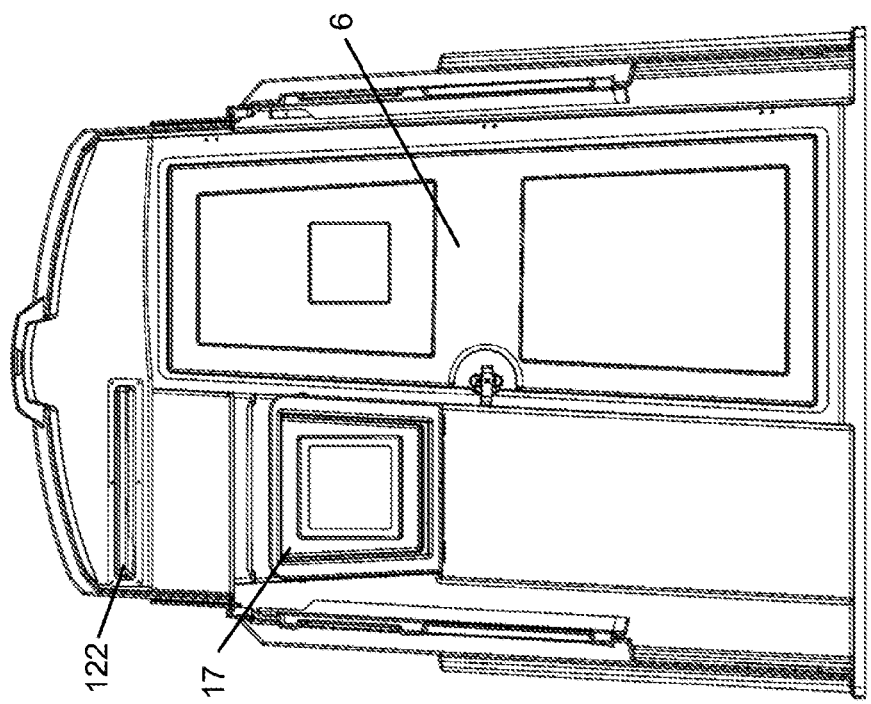
FIG. 1H shows a view of the interior of the other end of the molded hunting blind of FIG. 1A.
Figure 1G:
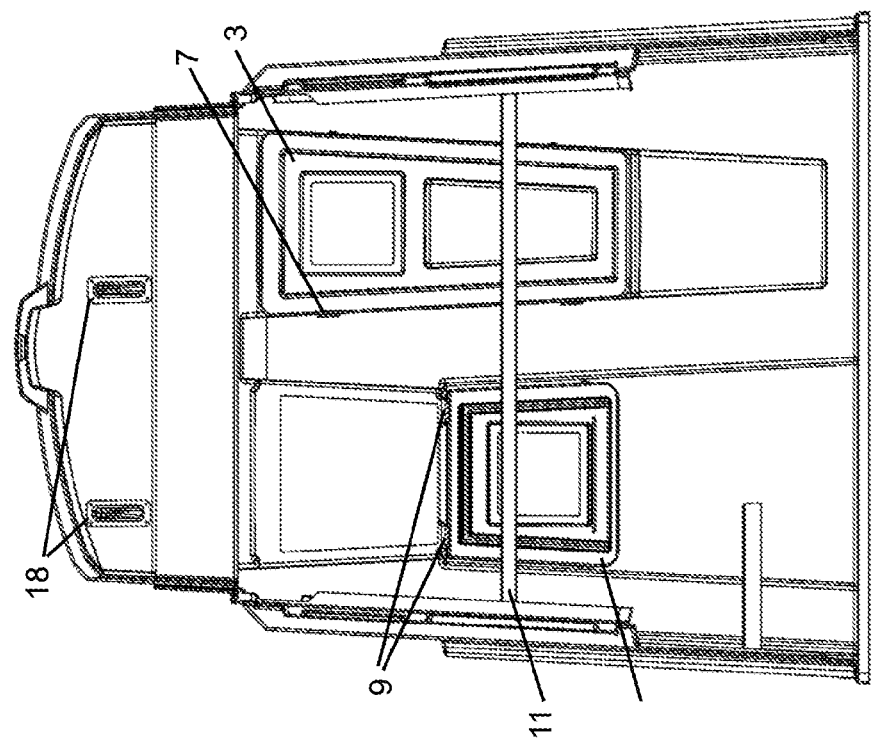
FIG. 1G shows a view of the interior of one end of the molded hunting blind of FIG. 1A.

FIG. 1G shows a view of the interior of one end side molded hunting blind of FIG. 1A. Rest 11 can be seen near open gun door 16 and archery door 3. Main door 6 is open about hinges 9. Archery door 3 can open about hinges 7. Gun rack 18 can be seen in an out of the way upper location.

FIG. 1H shows a view of the interior of the other end side molded hunting blind of FIG. 1A. Filming window 17 can be seen in more detail with hinges 9. Shelf 122 can also be seen in an out of the way upper location.

FIG. 1J shows a detailed underside isometric cut away view of molded hunting blind of FIG. 1A. Filming window 17 can be seen with latch mechanism 21 and hook 22. Seat 30 is affixed to the molded body 1. One end of a gun rack 18 is also affixed to the molded body 1. FIG. 1K shows a more detailed cut away view latch mechanism 21 and hook 22.

Figure 2E:
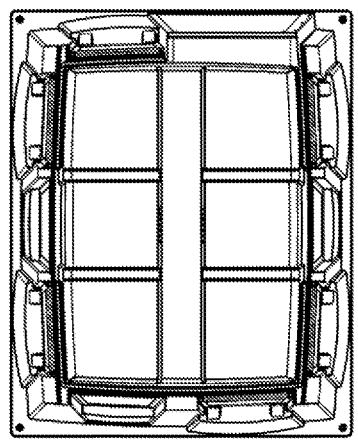
FIG. 2E shows the roof of the hunting blind of FIG. 2A.
Figure 2A:
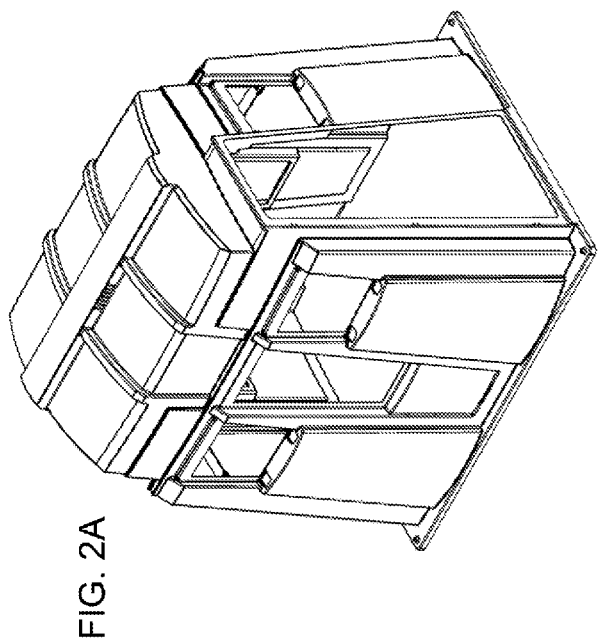
FIG. 2A shows an isometric view of another embodiment of an exemplary molded hunting blind.
Figure 2D:
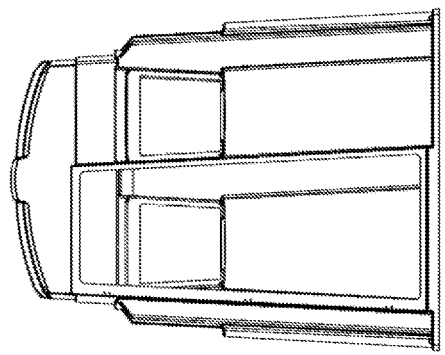
FIG. 2D shows another end view of the molded hunting blind of FIG. 2A.
Figure 2C:
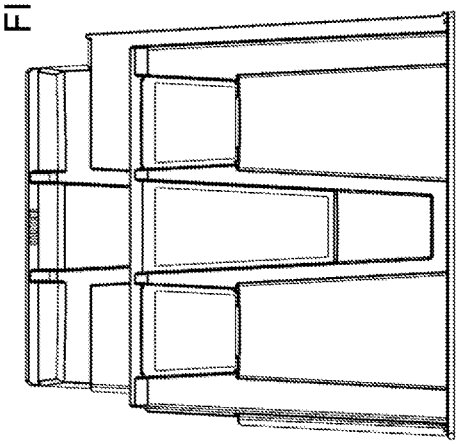
FIG. 2C shows a side view of the molded hunting blind of FIG. 2A.
Figure 2B:
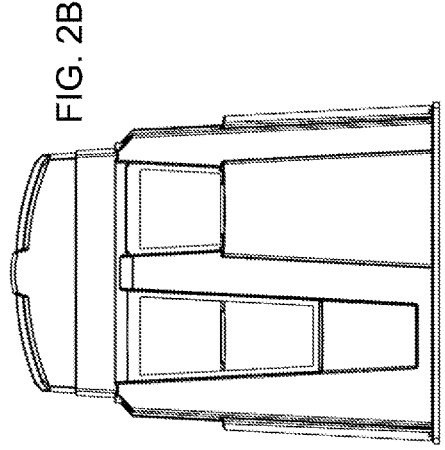
FIG. 2B shows an end view of the molded hunting blind of FIG. 2A.
Figure 2G:
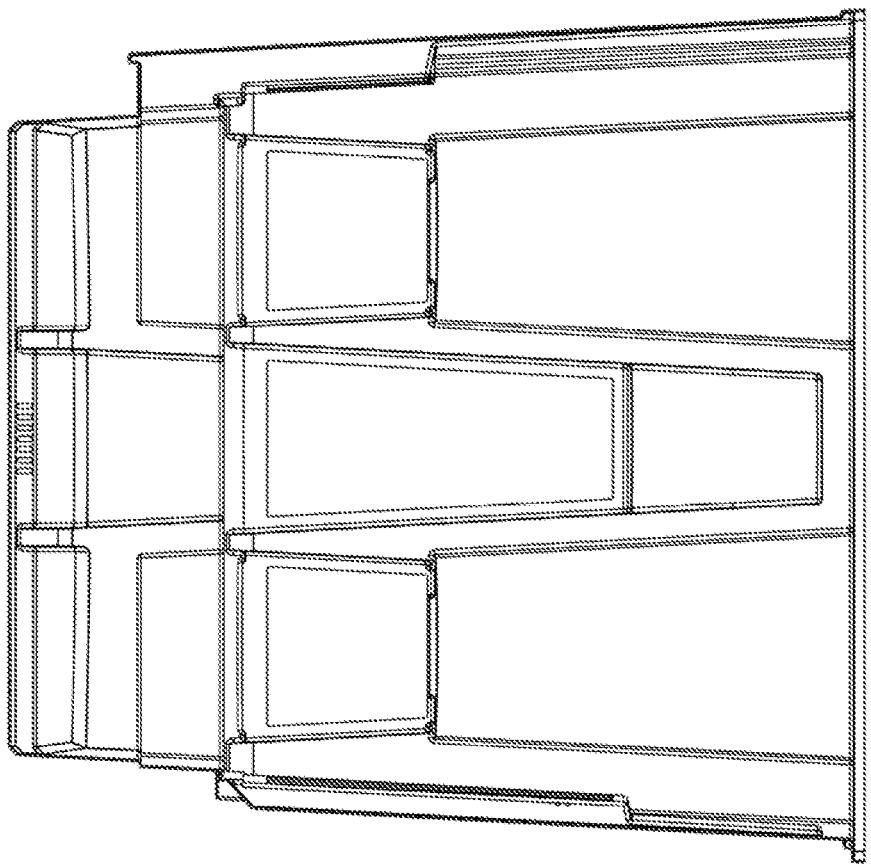
FIG. 2G shows a view of the interior of one side of the molded hunting blind of FIG. 2A.
Figure 2F:
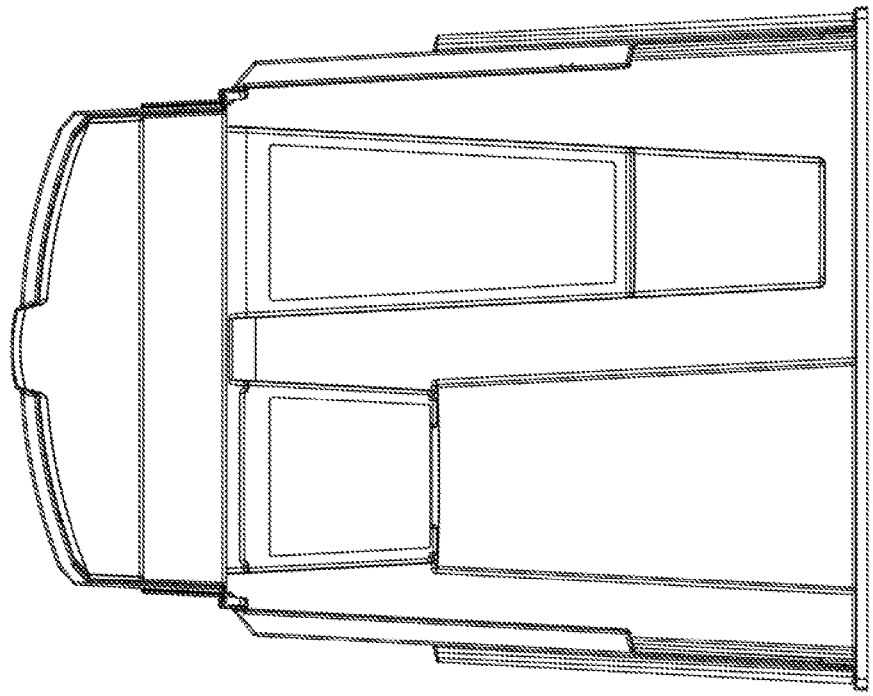
FIG. 2F shows a view of the interior of one end of the molded hunting blind of FIG. 2A.

FIG. 2A shows an isometric view of another embodiment of an exemplary molded hunting blind. FIG. 2B shows an end view of the molded hunting blind of FIG. 2A. FIG. 2C shows a side view of the molded hunting blind of FIG. 2A. FIG. 2D shows another end view of the molded hunting blind of FIG. 2A. FIG. 2E shows the roof of the hunting blind of FIG. 2A. FIG. 2F shows a view of the interior of one end of the molded hunting blind of FIG. 2A. FIG. 2G shows a view of the interior of one side of the molded hunting blind of FIG. 2A.

Components which can be fitted into the one piece molded hunting blind structure are now shown in more detail. Each of these components can also be formed using similar molding processes, such as for example as molded plastic parts.

Gun door: FIG. 3A shows an isometric view of a gun door. FIG. 3B shows a top view of the gun door of FIG. 3A. FIG. 3C shows a front view of the gun door of FIG. 3A. FIG. 3D shows a side view of the gun door of FIG. 3A. FIG. 3E shows a top view of the gun door of FIG. 3A showing mounting holes for the door hinges. FIG. 3F shows a section view of the gun door of FIG. 3E in a horizontal plane. FIG. 3G shows a section view of the gun door which is cut vertically in the center of the part of the gun door of FIG. 3A. In most embodiments, the gun door can easily open downward on hinges as a flip down door. In most embodiments, there are 2 drip edges on doors and windows, one over the window, the other at the bottom.

Filming windows: In most embodiments filming windows can be substantially the same as gun doors. One Archery door and one window could be sufficient for hunting. However, it was realized that additional filming windows could be added as a safety feature to avoid a potential hazardous situations, such as, for example, filming and shooting from the same window. These additional filming windows allow the shooter to shoot from one window (e.g. a gun door) on one end and to perform filming from another filming window. This was done to avoid a potentially dangerous situation where both the shooter and the filming are done through one common door or window.

Archery door: FIG. 4A shows an isometric view of an archery door. FIG. 4B shows an exterior front view of the archery door of FIG. 4A. FIG. 4C shows an interior view of the archery door of FIG. 4A. FIG. 4D shows a top view of the archery door of FIG. 4A. FIG. 4E shows a section view with more detail of the archery door of FIG. 4A. FIG. 4F shows a side view of the archery door of FIG. 4A. FIG. 4G shows more detail in a side view of the archery door of FIG. 4A.

Main door: FIG. 5A shows an isometric view of the exterior of the main door. FIG. 5B shows an isometric view of the interior of the main door of FIG. 5A. FIG. 5C shows a top view of the main door of FIG. 5A. FIG. 5D shows a front view of the main door of FIG. 5A. FIG. 5E shows a side view of the main door of FIG. 5A. FIG. 5F shows an interior view of the main door of FIG. 5A. FIG. 5G shows another side view of the main door of FIG. 5A. FIG. 5H shows a detailed section view of the main door of FIG. 5A. FIG. 5I shows a detailed front cut away view of holes for the door handle of the main door of FIG. 5A. FIG. 5J shows a detailed interior cut away view of the interior section of FIG. 5I. FIG. 5K shows another more detailed section view of the main door of FIG. 5A.

Figure 6E:
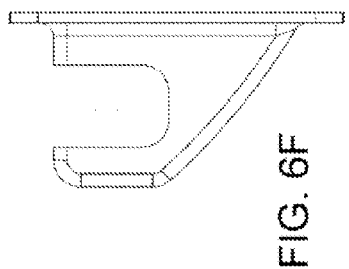
FIG. 6E shows an isometric view of another gun rack bracket.
Figure 6F:
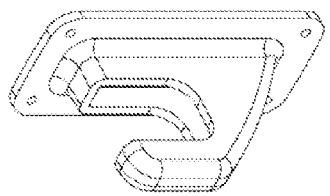
FIG. 6F shows a side view of the gun rack bracket of FIG. 6E.
Figure 6H:
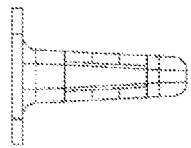
FIG. 6H shows a top view of the gun rack bracket of FIG. 6E.
Figure 6G:
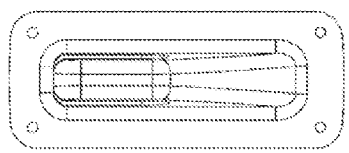
FIG. 6G shows a front view of the gun rack bracket of FIG. 6E.
Figure 6A:
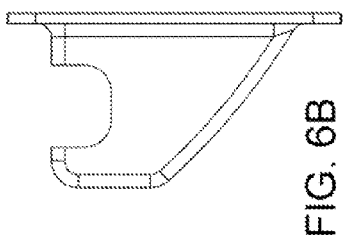
FIG. 6A shows an isometric view of an exemplary gun rack bracket.
Figure 6B:
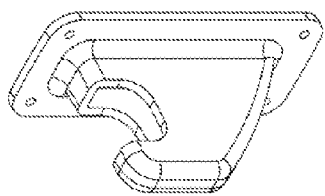
FIG. 6B shows a side view of the gun rack bracket of FIG. 6A.
Figure 6D:
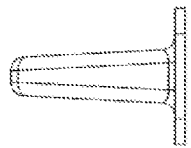
FIG. 6D shows a bottom view of the gun rack bracket of FIG. 6A.
Figure 6C:
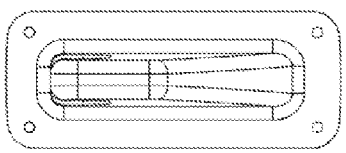
FIG. 6C shows a front view of the gun rack bracket of FIG. 6A.

Gun rack: FIG. 6A shows an isometric view of a gun rack bracket, such as to support the barrel of a long gun. FIG. 6B shows a side view of the gun rack bracket of FIG. 6A. FIG. 6C shows a front view of the gun rack bracket of FIG. 6A. FIG. 6D shows a top view of the gun rack bracket of FIG. 6A. FIG. 6E shows an isometric view of another gun rack bracket, such as to support the stock of a long gun. FIG. 6F shows a side view of the gun rack bracket of FIG. 6E. FIG. 6G shows a front view of the gun rack bracket of FIG. 6E. FIG. 6H shows a top view of the gun rack bracket of FIG. 6E.

Inward opening doors: As can be seen, for example, in FIG. 1A and FIG. 1J, filming windows and gun doors can be opened inwardly and downward into expanded protruding sections of the main body. The expanded outwardly molded protruding sections of the main body can accept the inwardly open windows, thus substantially maintaining the interior space of the hunting blind. In most embodiments, such as can also be seen in FIG. 1A, windows and archery doors are recessed inward to block wind and to help conceal a shooter and/or a photographer. The wall and roof structural features, such as the recessed window frames and expanded outwardly molded protruding sections of the main body, also help to mechanically or physically strengthen the structure as compared to a flat surfaced shelter.

Carrying handle: FIG. 7A shows an isometric view of an exemplary carrying handle. FIG. 7B shows a top view of the carrying handle of FIG. 7A. FIG. 7C shows a side view of the carrying handle of FIG. 7A. FIG. 7D shows an end view of the carrying handle of FIG. 7A. FIG. 7E shows a bottom view of the carrying handle of FIG. 7A.

Seat: FIG. 8A shows an isometric view of an exemplary seat. FIG. 8B shows a top view of the seat of FIG. 8A. FIG. 8C shows a bottom view of the seat of FIG. 8A. FIG. 8D shows a side view of the seat of FIG. 8A. FIG. 8E shows another side view of the seat of FIG. 8A. FIG. 8F shows yet another side view of the seat of FIG. 8A. FIG. 8G shows a detailed section view of the seat of FIG. 8A.

Figure 9B:
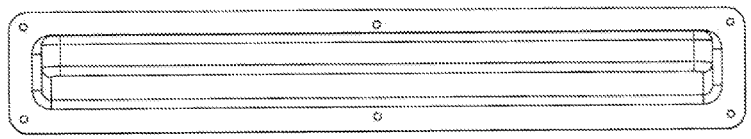
FIG. 9B shows a side view of the shelf of FIG. 9A.
Figure 9A:
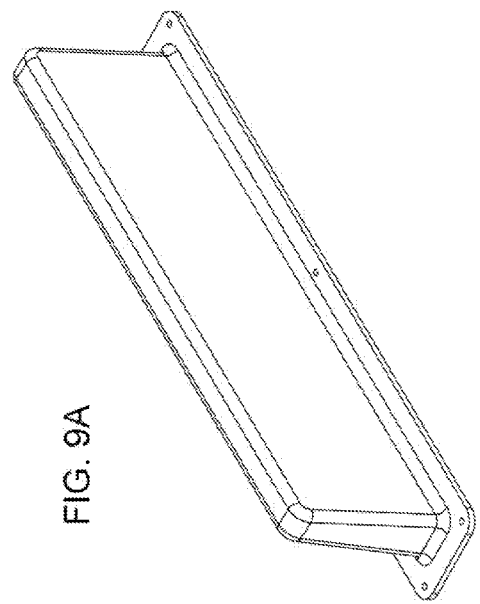
FIG. 9A shows an isometric view of an exemplary shelf.
Figure 9D:
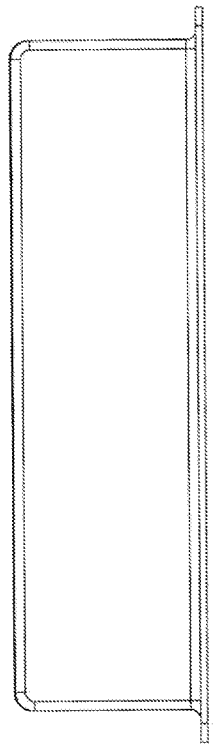
FIG. 9D shows a top view of the shelf of FIG. 9A.
Figure 9C:
FIG. 9C shows another side view of the shelf of FIG. 9A.

Shelf: FIG. 9A shows an isometric view of an exemplary shelf. FIG. 9B shows a side view of the shelf of FIG. 9A. FIG. 9C shows another side view of the shelf of FIG. 9A. FIG. 9D shows a top view of the shelf of FIG. 9A.

Figure 10B:
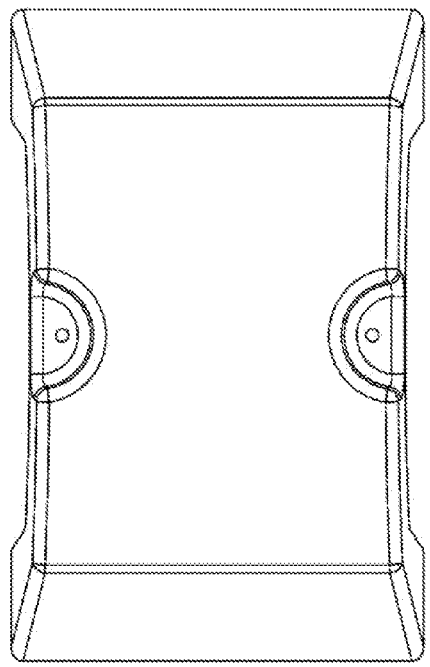
FIG. 10B shows a top view of the roof vent of FIG. 10A.
Figure 10D:
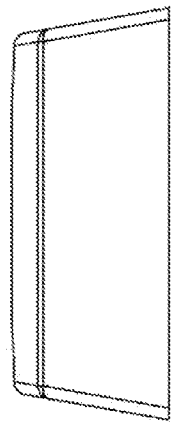
FIG. 10D shows another side view of the roof vent of FIG. 10A.
Figure 10A:
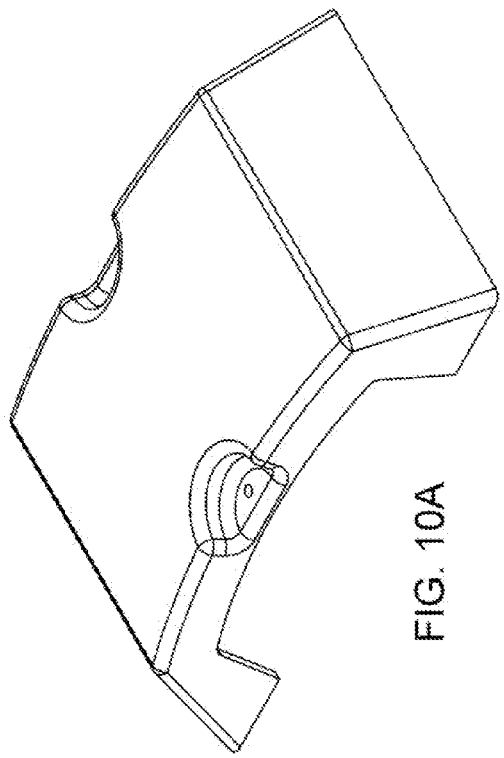
FIG. 10A shows an isometric view of an exemplary roof vent.
Figure 10C:
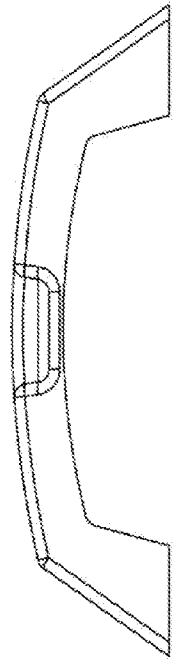
FIG. 10C shows a side view of the roof vent of FIG. 10A.

Roof vent: FIG. 10A shows an isometric view of an exemplary roof vent. FIG. 10B shows a top view of the roof vent of FIG. 10A. FIG. 10C shows a side view of the roof vent of FIG. 10A. FIG. 10D shows another side view of the roof vent of FIG. 10A.

Figure 11A:
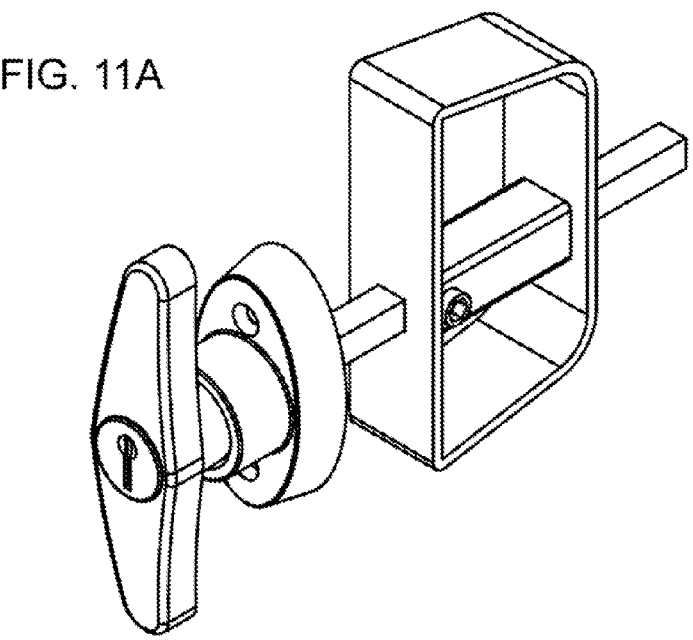
FIG. 11A shows an isometric view of an exemplary door handle.
Figure 11B:
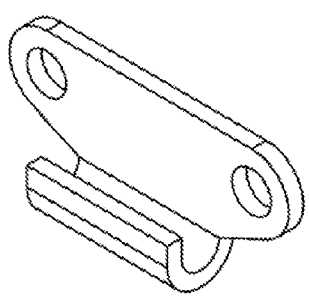
FIG. 11B shows an isometric view of an exemplary hook.
Figure 11C:
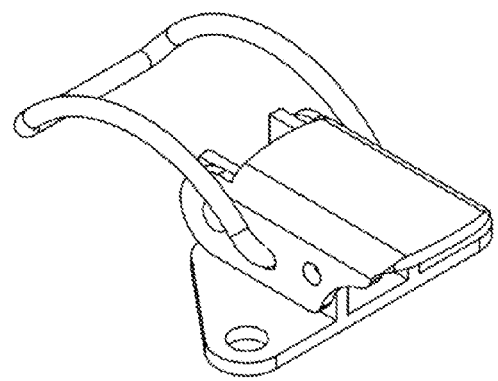
FIG. 11C shows an isometric view of an exemplary latch mechanism.

Hardware: FIG. 11A shows an isometric view of an exemplary door handle. FIG. 11B shows an isometric view of an exemplary hook. FIG. 11C shows an isometric view of an exemplary latch mechanism.

Stacking: It was realized that the body can be slanted inwards toward the center of the unit, typically at an angle of between about 1 degree to 18 degrees off vertical, preferably between about 3 degrees and 6 degrees, to make stacking the one piece molded bodies partially nested (e.g. stacking household cups) possible. The roof and walls of the hunting blinds described herein are slanted inwards towards the roof to allow such stacking. Considerations for stacking include window shapes, window movement direction, gun rests, and window ledges. For example, the outwardly protruding sections are angled in towards the roof off vertical, similar to how the walls are slanted into towards the roof. Similarly, slant angles, such as, for example, the angles of the sides of the archery window also allow for nestable stacking.

Figure 12A:
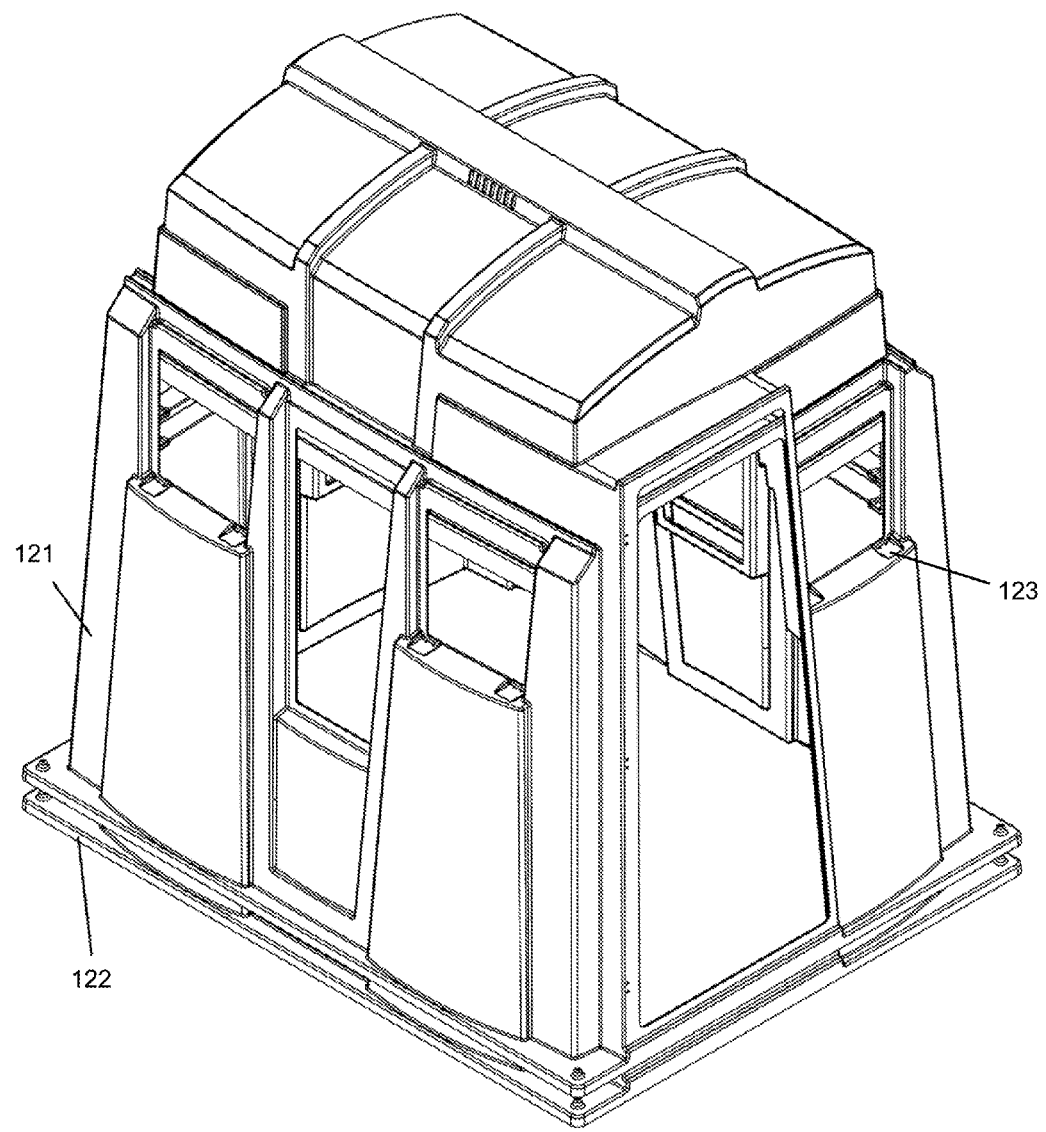
FIG. 12A shows an isometric view of exemplary stacked hunting blind bodies.
Figure 12B:
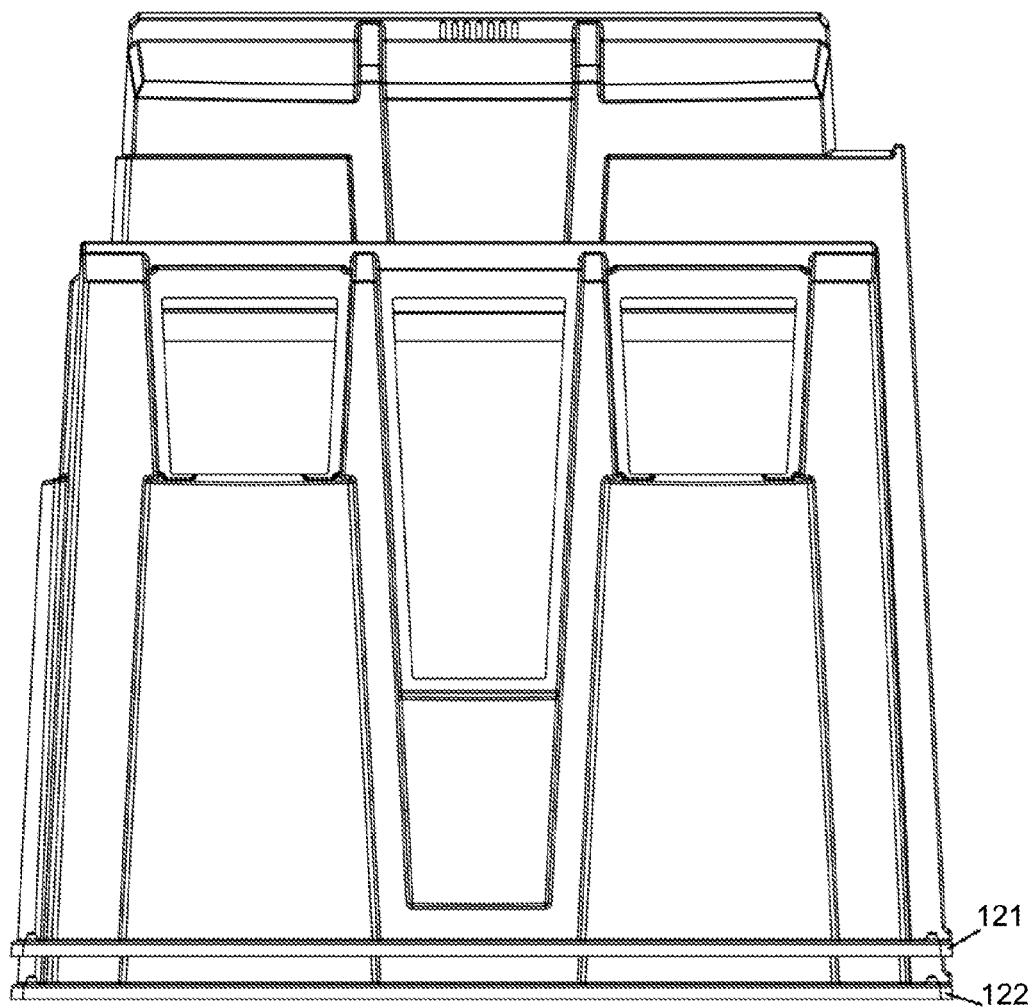
FIG. 12B shows a side view of the stacked hunting blind bodies of FIG. 12A.
Figure 12C:
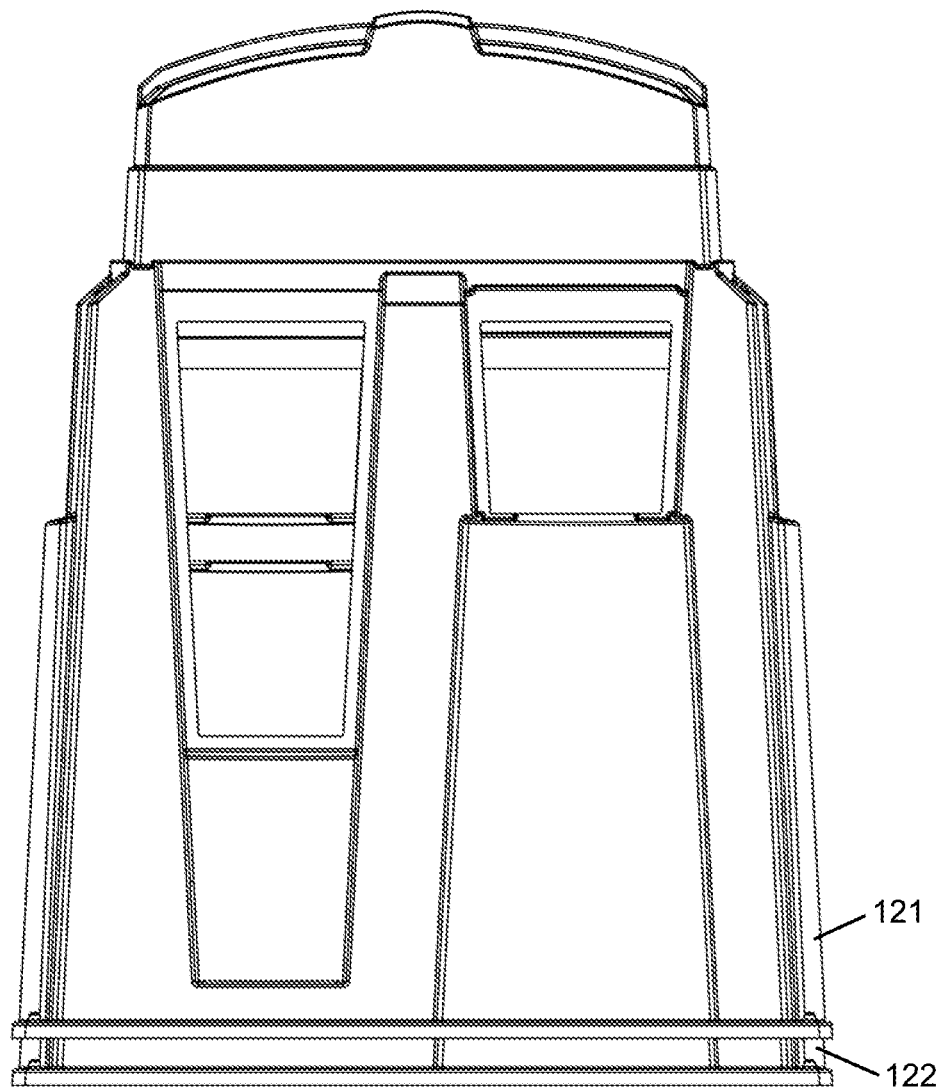
FIG. 12C shows an end view of the stacked hunting blind bodies of FIG. 12A.
Figure 12D:
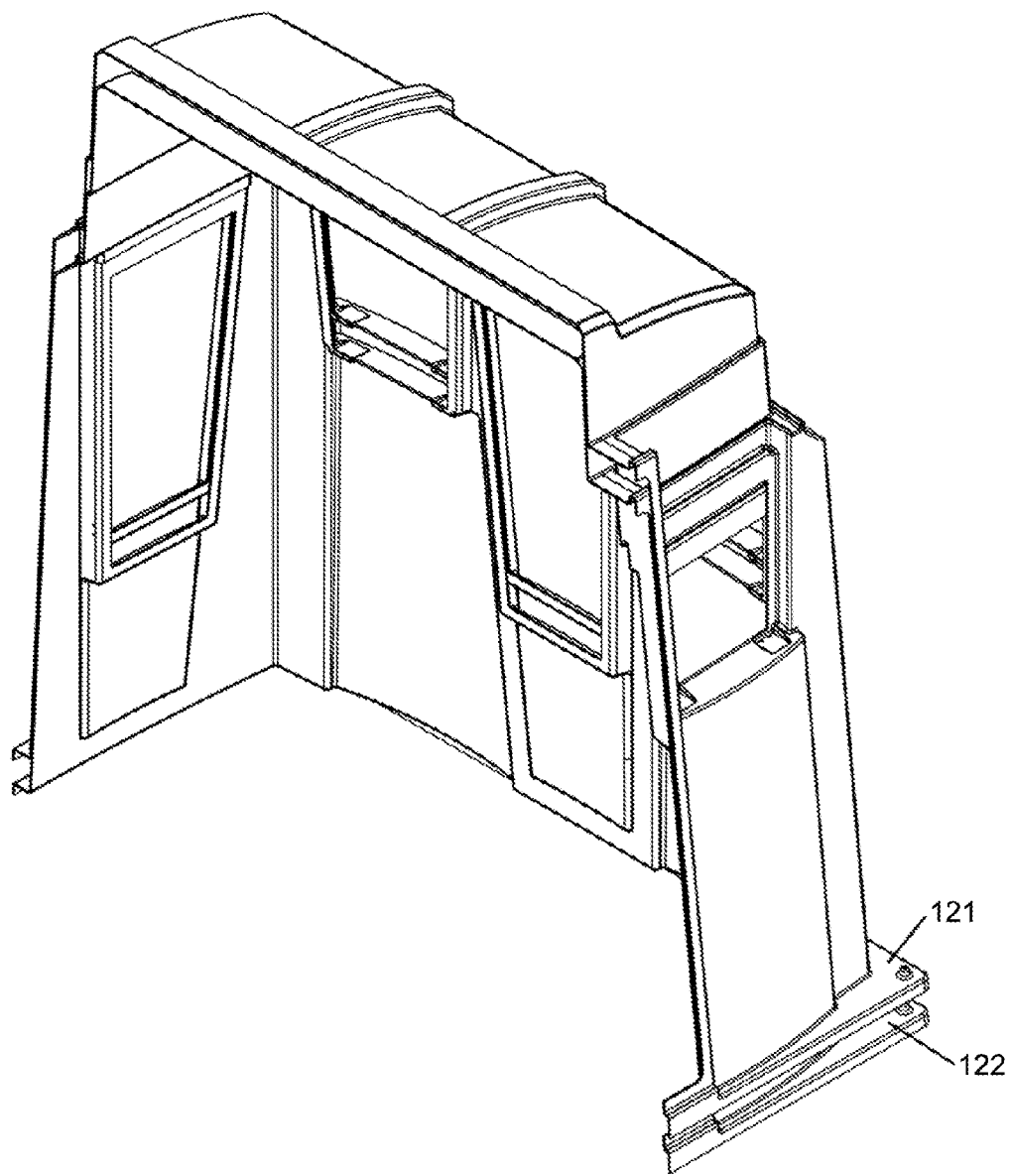
FIG. 12D shows an over-head cut-away view of the inside of the stacked hunting blind bodies of FIG. 12A.
Figure 12E:
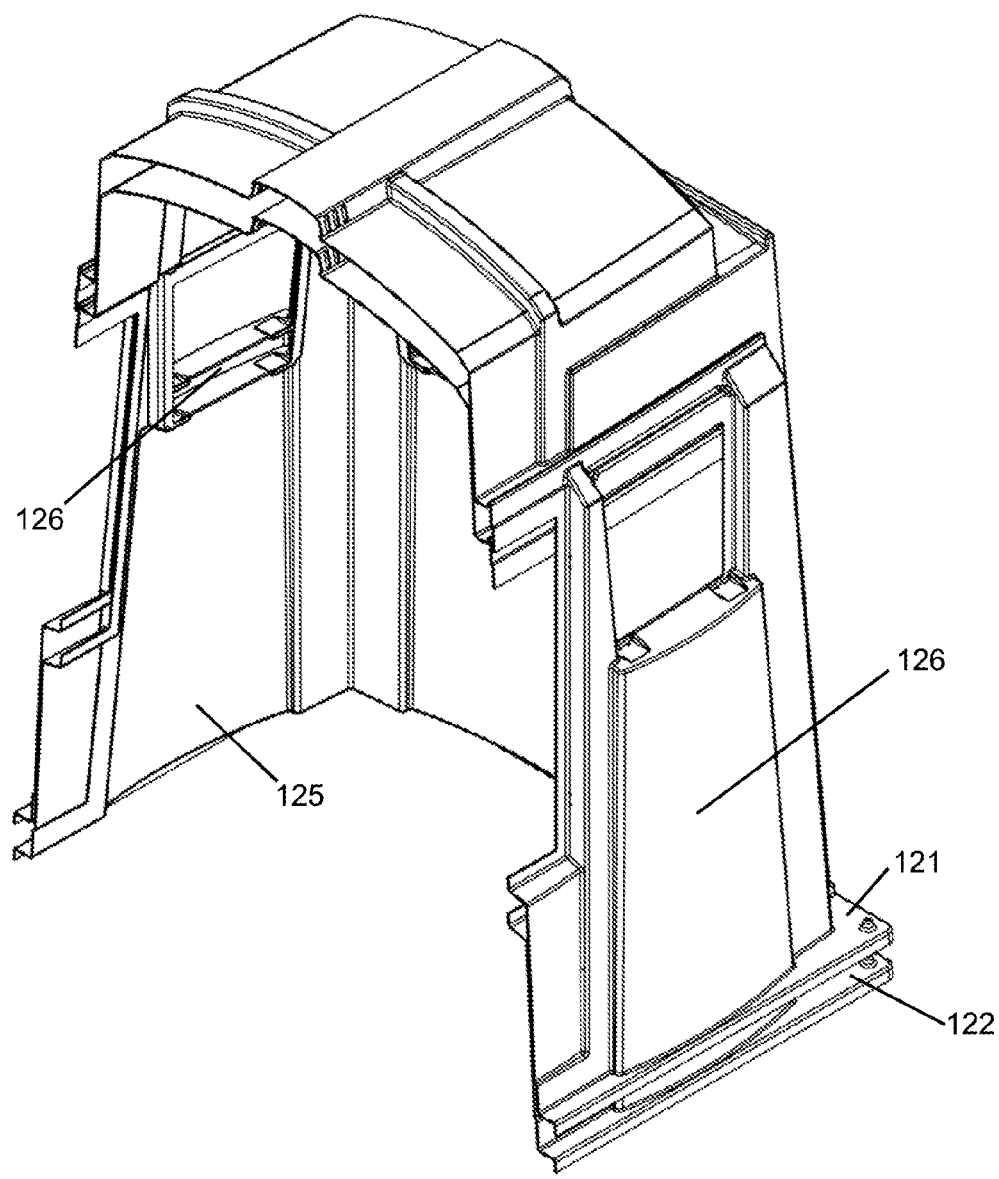
FIG. 12E shows an over-head cut-away view of the inside end portion of the stacked hunting blind bodies of FIG. 12A.
Figure 12F:
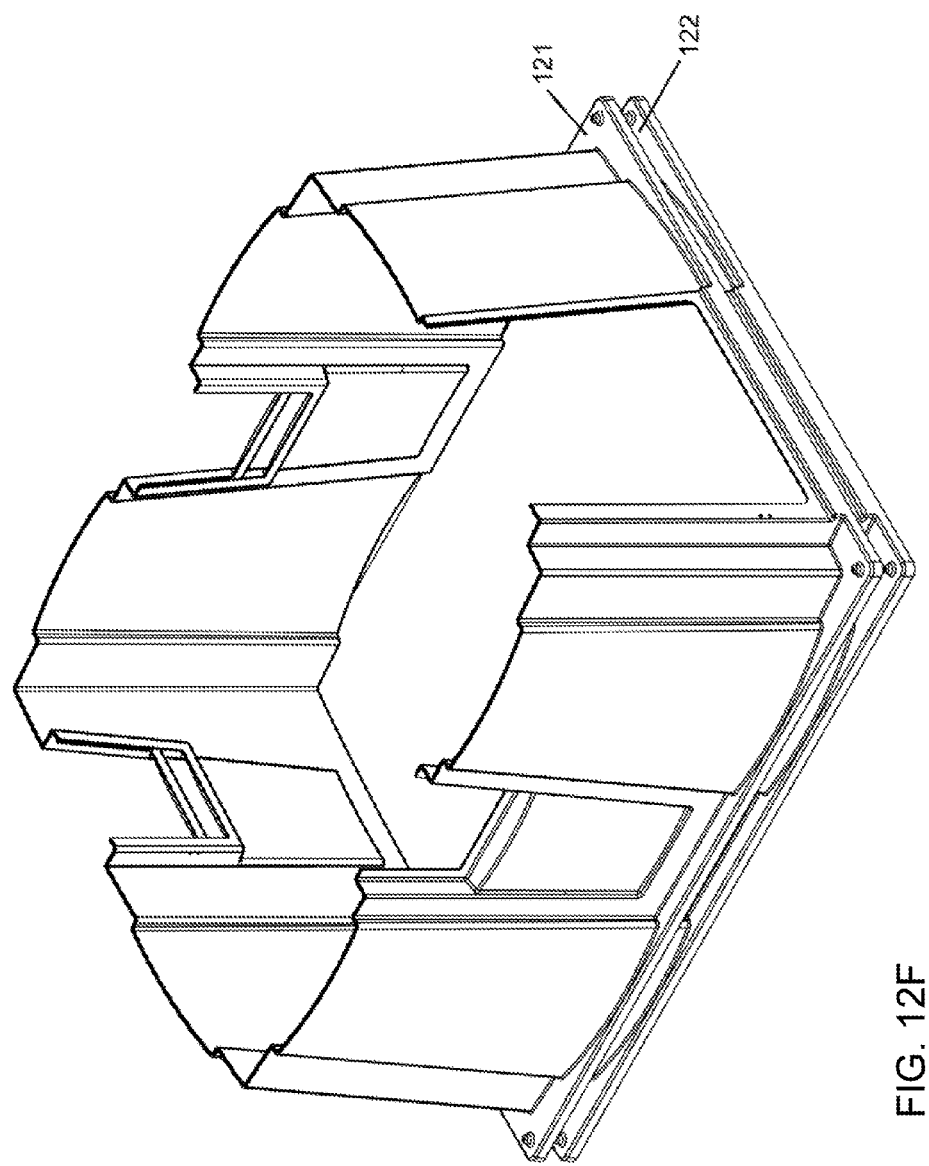
FIG. 12F shows an over-head cut-away view of the inside lower portion of the body of the stacked hunting blind bodies of FIG. 12A.

FIG. 12A shows an isometric view of exemplary stacked hunting blind bodies. Exemplary one piece molded body 121 is shown nestingly stacked over one piece molded body 122. It is understood that additional one piece molded bodies can be so stacked, limited only by considerations of total weight and height of the nested stack. In the exemplary embodiment of FIG. 12A, a recess 123 can be seen which will later accept one side of a window or door hinge (e.g. hinge 9, FIG. 1J). FIG. 12B shows a side view of the stacked hunting blind bodies of FIG. 12A. As can be seen in FIG. 12B, using the angular ranges described herein above for the walls, windows, and other slanted and/or protruded wall features (e.g. bowed out), nestable stacking can be efficient in stacked height. For example, in the exemplary stack of FIG. 12B, the added height for each additional nestably stacked hunting blind body can be seen to be less than about 5% to 10% of the height of a single one piece hunting blind body. FIG. 12C shows an end view of the stacked hunting blind bodies of FIG. 12A. FIG. 12D shows an over-head cut-away view of the inside of the stacked hunting blind bodies of FIG. 12A. FIG. 12E shows an over-head cut-away view of the inside end portion of the stacked hunting blind bodies of FIG. 12A. Expanded protruding sections 126, 125 of the main bodies 121, 122 respectively can be seen to nest within each other, enhancing the stability of the stacked structure. FIG. 12F shows an over-head cut-away view of the inside lower portion of the body of the stacked hunting blind bodies of FIG. 12A.

Arm and elbow rest: In addition to the gun rest an arm rest can accommodate both left and right hand shooters. One problem was that the tapered design of the unit seemingly did not allow for room to accommodate an arm rest. The Arm rest should stick out about 24 inches from the window and about 12 inches from the wall. Ideally, up to four arm rests can be installed at each window. However, four separate arm rests limited the space inside the shelter. To allow for arm rests, window operation the up (because of the taper) and side-ways directions (because of the arm rest location) was also problematic. Another concern was accessibility and to still allow room for filming and a second person in the hunting blind.

The solution was to extend the main body by about two inches on each end. Brackets can be molded with main body of the mold. The brackets also allow arm rests not in use to be removed (e.g. when only one arm rest is needed, the other three can be removed). In some embodiments, the arm rest can be inserted into the bracket attached to the main body. Also, the same arm rest can work for all windows. Thus, in many uses, one arm rest can be used, eliminating the need for a permanently installed arm rest at each window. The arm rest solution described hereinabove significantly improves the working space within the hunting blind. Also, a user can slide the arm rest out and place it at the other end depending on if the user is a right hand or left hand shooter.

The arm rest solution described hereinabove significantly improves the working space within the hunting blind. Also, use of the arm rest set in brackets for a right handed or left handed shooter allows for more accurate shots.

Manufacturing: Typically, most accessory parts can be molded in the same mold and at the same time as the main body is molded. However in a typical molding manufacturing processes, one of the largest accessory parts, the main door, can be more conveniently manufactured using a separate mold. A mold polyethylene can be used as the molding material.

A color can be dyed into at least one side of the molding material. In one embodiment of a manufacturing process, the outer color can be provided by mixing a pigment into a natural powdered polyethylene at a rate of 1 gram per pound, and mixing in a mixer until all of the powder is coated. For an inner layer of black color, natural pellets can be melted in an extruder with a black pigment pellet at a rate of around ¾%. The material can be mixed by the extruder screw and extruded into thin rods which are cut into pellets and then ground into powder. Using such manufacturing techniques, the color can be added throughout the material thickness. In one embodiment, the outer color is added to the mold as a powder which melts with heat, becoming a solid. The inner color is then applied using a second shot hopper. It is also a powder that melts with the heat and forms an inside layer. The composite one piece molded hunting blind body ends up with an outside distinct color layer and an inside distinct color layer. Thus, the process to make the one piece molded body can include providing a first molding material having a first dyed color which will form the outer surface of the molded hunting blind and a second molding material having a second dyed color which will provide the inner surface of the molded hunting blind. Following such a molding process, the result is a composite two colored one piece molded hunting blind body.

Transport: In some embodiments, a hunting blind as described hereinabove can have a width suitable to fit in the back of a full size pick-up truck, yet big enough to easily draw a bow back while shooting a bow out of the archery door to the front or to the back of the shelter. Shooting from end to end (the length of the hunting blind) was not an issue for drawing a bow, however shooting from front to back (the width) can been problematic, because of the length of a draw on a bow is substantial. Being able to easily load hunting blinds as described hereinabove into the back of a pick-up truck solves the problem of transporting the hunting blind to hunting spots, while maintaining the ability to draw a bow front to back.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A one body piece molded hunting blind comprising:
    a one piece molded body having walls and a roof and a base flange defining an open bottom and adapted for use on an outdoor ground surface, said one piece molded body comprising an inside surface and an outside surface:
        wherein said outside surface of said one piece molded body comprises a light color and said inside surface of said one piece molded body comprises a dark color for use in warm or hot temperature applications, or
        wherein said outside surface of said one piece molded body comprises a dark color and said inside surface of said one piece molded body comprises a dark color for use in cool or cold temperature applications;
    a molded door and a plurality of windows disposed in said walls of said one piece molded body;
    at least one archery door with a taper configured to limit movement, or at least one gun door with a gun rest and an arm rest, disposed in said walls of said one piece hunting blind molded body;
    at least one archery window having a tapered opening framed by non-rectangular side lines to form a vertical tapering wider at the top to provide archer shooting room and narrow at the bottom to limit visibility from the archer being spotted;
    a molded shelf;
    wherein two or more of said one piece molded bodies are configured to be nestably stackable;
    wherein expanded protruding sections of each of said one piece molded body enhances a stability of a nestably stacked structure; and
    wherein said archery door and said gun door are configured to open inwardly to minimize detection by wildlife.

2. The molded hunting blind of claim 1, wherein said one piece molded body comprises walls which slant inward towards a roof.

3. The molded hunting blind of claim 2, wherein said walls slant inward towards said roof at an angle of between about 1 degree and about 18 degrees.

4. The molded hunting blind of claim 1, wherein said archery door and said gun door are recessed in a wall of said molded hunting blind.

5. The molded hunting blind of claim 1, wherein said archery door comprises a vertical taper of between about 1 degree and 8 degrees off vertical.

6. The molded hunting blind of claim 1, wherein said one piece body further comprises a plurality of outwardly protruding molded sections configured to house an inwardly open window or door.

7. The molded hunting blind of claim 1, wherein said one piece body further comprises a plurality of outwardly protruding molded sections configured to mechanically strengthen said molded hunting blind.

8. The molded hunting blind of claim 1, wherein said one piece molded body comprises molded brackets configured to accept said arm rest.

9. The molded hunting blind of claim 1, wherein said arm rest is configurable to a right hand or left hand shooter.

10. The molded hunting blind of claim 1, further comprising a molded gun rack.

11. The molded hunting blind of claim 1, wherein a color is died into a plastic of said one piece molded body.

12. The molded hunting blind of claim 1, further comprising handles configured for carrying and positioning said hunting blind.

13. The molded hunting blind of claim 1, further comprising holes in said base flange configured for anchoring said hunting blind.

14. The molded hunting blind of claim 1, wherein said one piece molded body is seamless.

15. The molded hunting blind of claim 1, wherein two or more of said one piece molded bodies are configured to be nestably stackable such that the added height for each additional nestably stacked hunting blind body is less than about 10% of the height of a single one piece hunting blind body.

16. A process for molding a one piece molded hunting blind comprising the steps of:
    providing a mold of said one piece molded hunting blind to make a one body piece molded hunting blind comprising: a one piece molded body having walls and a roof and a base flange defining an open bottom and adapted for use on an outdoor ground surface, said one piece molded body comprising an inside surface and an outside surface: wherein said outside surface of said one piece molded body comprises a light color and said inside surface of said one piece molded body comprises a dark color for use in warm or hot temperature applications, or wherein said outside surface of said one piece molded body comprises a dark color and said inside surface of said one piece molded body comprises a dark color for use in cool or cold temperature applications,
    a molded door and a plurality of windows disposed in said walls of said one piece molded body, at least one archery door with a taper configured to limit movement, or at least one gun door with a gun rest and an arm rest, disposed in said walls of said one piece hunting blind molded body, at least one archery window having a tapered opening framed by non-rectangular side lines to form a vertical tapering wider at the top to provide archer shooting room and narrow at the bottom to limit visibility from the archer being spotted, wherein two or more of said one piece molded bodies are configured to be nestably stackable, a molded shelf, wherein expanded protruding sections of each of said one piece molded body enhances a stability of a nestably stacked structure, and wherein said archery door and said gun door are configured to open inwardly to minimize detection by wildlife;

providing a molding material; and molding a one piece molded body.

17. The process of claim 16, wherein said step of molding comprises molding simultaneously a plurality of hunting blind components using a common mold.

18. The process of claim 16, wherein said step of providing a molding material comprises providing a molding material having a color dyed into at least one side of said molding material.

19. The process of claim 18, wherein said step of providing a molding material comprises providing a molding material comprising a first molding material having a first color for forming an outer surface of said molded hunting blind and a second molding material having a second color for forming an inner surface of said molded hunting blind.

\* \* \* \* \*